(12) United States Patent
Kirjavainen

(10) Patent No.: US 6,837,457 B2
(45) Date of Patent: Jan. 4, 2005

(54) AIRCRAFT ROTOR AND AIRCRAFT

(75) Inventor: Kari Kirjavainen, Tampere (FI)

(73) Assignee: Natural Colour Kari Kirjavainen Oy, Tampere (FI)

( * ) Notice: Subject to any disclaimer, the term of this patent is extended or adjusted under 35 U.S.C. 154(b) by 0 days.

(21) Appl. No.: 09/865,540

(22) Filed: May 29, 2001

(65) Prior Publication Data

US 2002/0014554 A1 Feb. 7, 2002

Related U.S. Application Data

(63) Continuation-in-part of application No. PCT/FI00/00754, filed on Sep. 7, 2000.

(30) Foreign Application Priority Data

Nov. 29, 1999 (FI) .............................................. 19992543

(51) Int. Cl.[7] .............................................. B64C 27/10
(52) U.S. Cl. .................................. 244/17.23; 244/12.2
(58) Field of Search ........................ 244/17.11, 17.23, 244/21, 23 C, 12.2; 446/36, 37, 58, 46

(56) References Cited

U.S. PATENT DOCUMENTS

| | | | | |
|---|---|---|---|---|
| 2,397,632 A | * | 4/1946 | Stuart | |
| 3,288,396 A | * | 11/1966 | Gouin | |
| 3,437,290 A | * | 4/1969 | Norman | |
| 3,606,209 A | * | 9/1971 | Rosta et al. | |
| 3,774,865 A | * | 11/1973 | Pinto | |
| 4,478,379 A | * | 10/1984 | Kerr | |
| 4,913,376 A | * | 4/1990 | Black | |
| 5,106,035 A | * | 4/1992 | Langford | |
| 5,297,759 A | * | 3/1994 | Tilbor et al. | |
| 5,683,060 A | * | 11/1997 | Iturralde | |
| 6,158,960 A | * | 12/2000 | Marsi | |

FOREIGN PATENT DOCUMENTS

| | | | |
|---|---|---|---|
| CA | 2195581 | * | 7/1998 |
| DE | 26 04 575 A1 | | 8/1976 |
| DE | 27 25 221 A1 | | 12/1978 |

* cited by examiner

Primary Examiner—Tien Dinh
(74) Attorney, Agent, or Firm—Young & Thompson

(57) ABSTRACT

An aircraft rotor and an aircraft which aircraft has a body and a rotor arranged to it, the rotor having at least two blades. The rotor is arranged to rotate around a substantially vertical axis. The blades are arranged in such a manner that, when rotating, they form a conical surface, whereby to provide ascending force, the ascending force coefficients of the blades are adjusted to be positive and to provide propulsive force, the ascending force coefficients of the blades on the forward side and on the rear side are adjusted to have opposite signs.

19 Claims, 11 Drawing Sheets

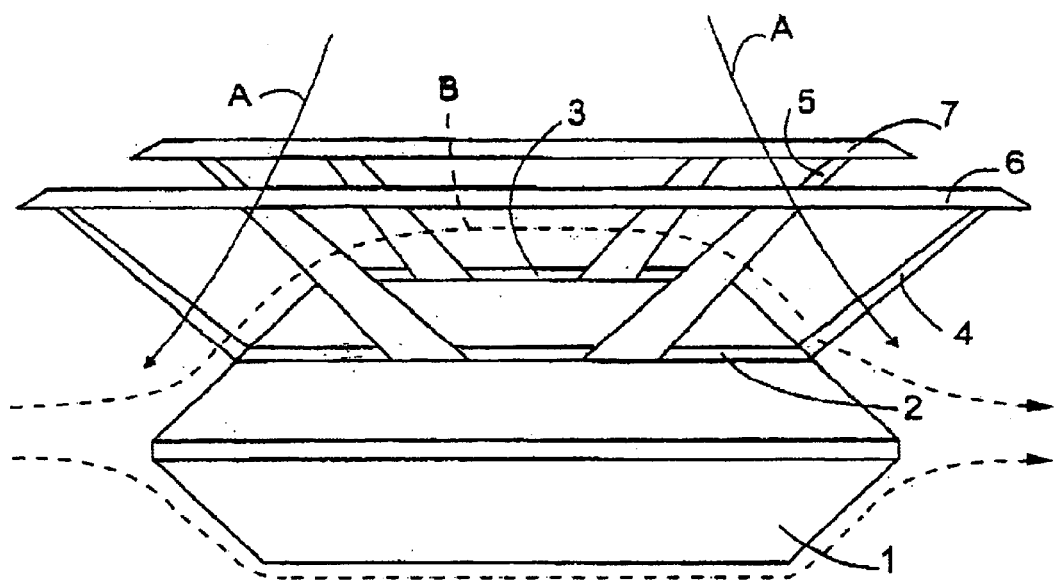
FIG. 1a
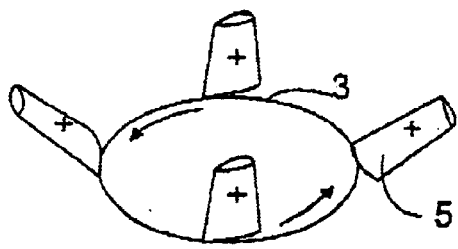
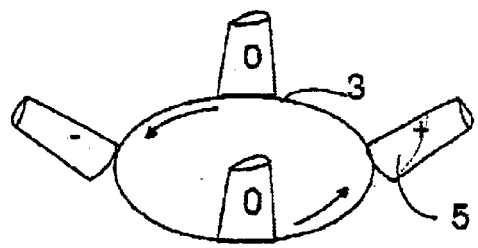
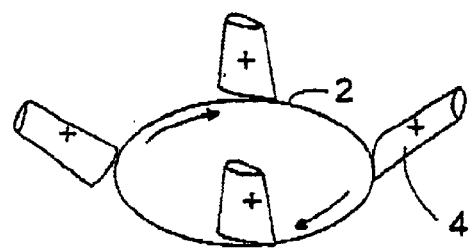
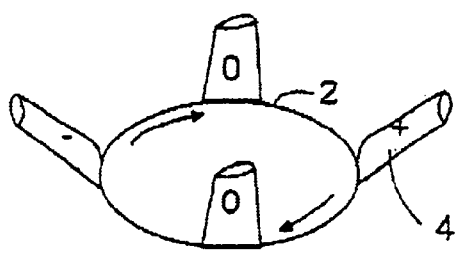
FIG. 1b  FIG. 1c

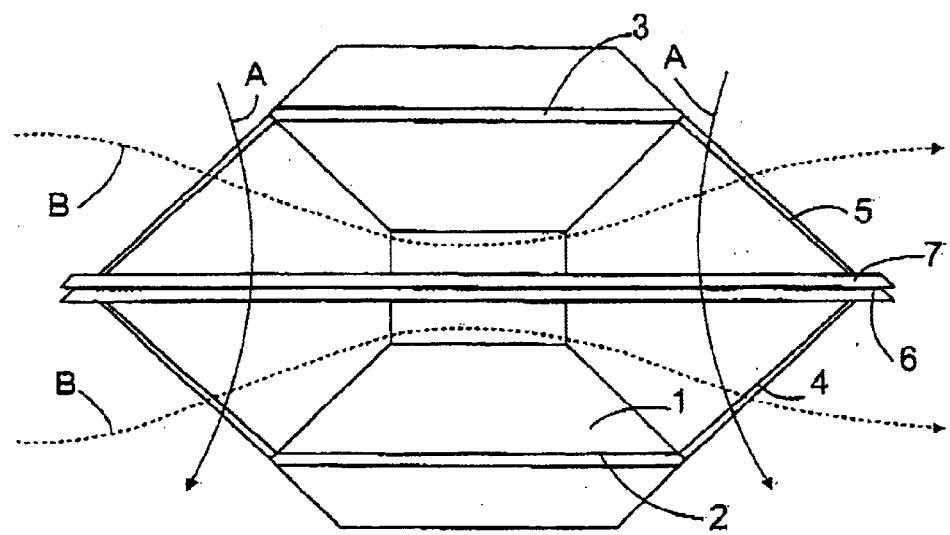
FIG. 2a
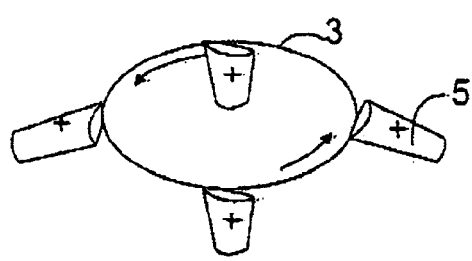 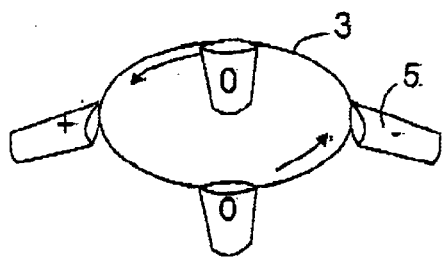
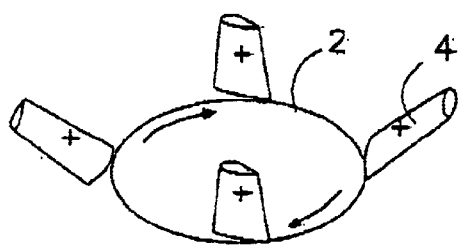 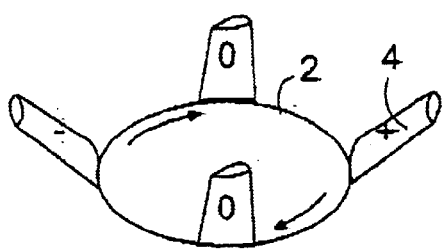
FIG. 2b                   FIG. 2c

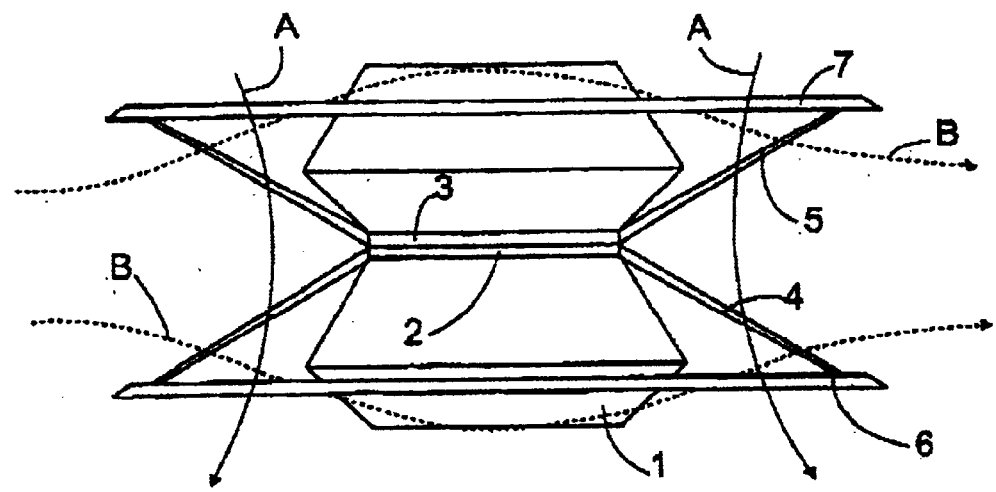
FIG. 3a
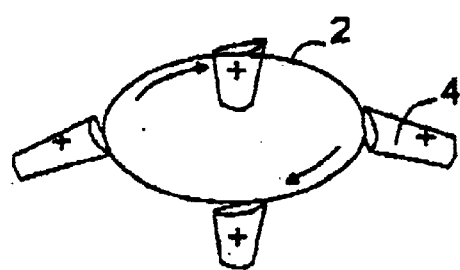
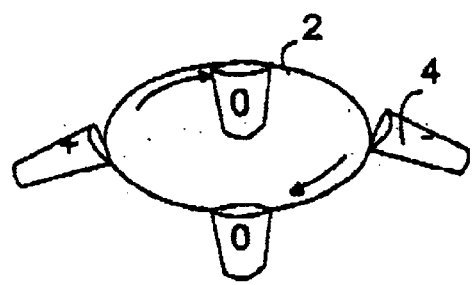
FIG. 3b                    FIG. 3c

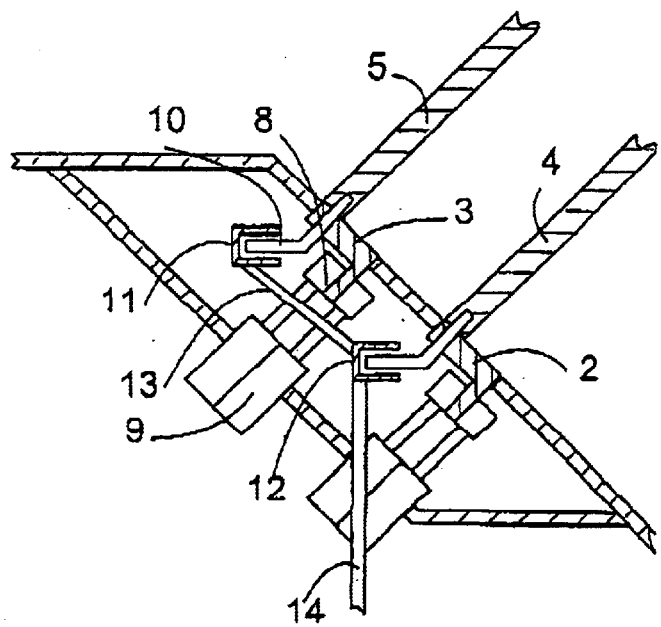
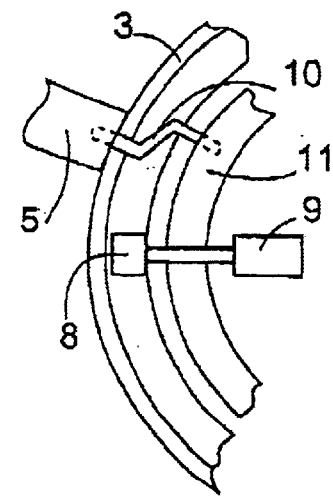
FIG. 4a
FIG. 4b
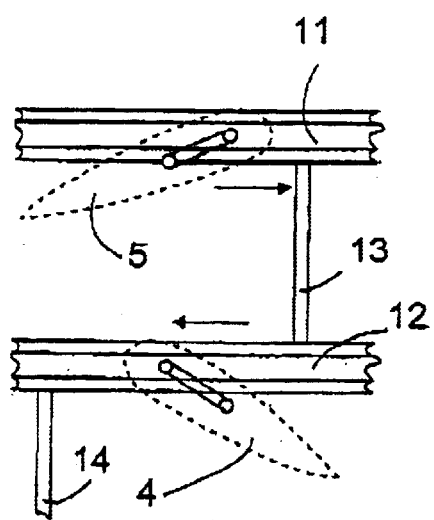
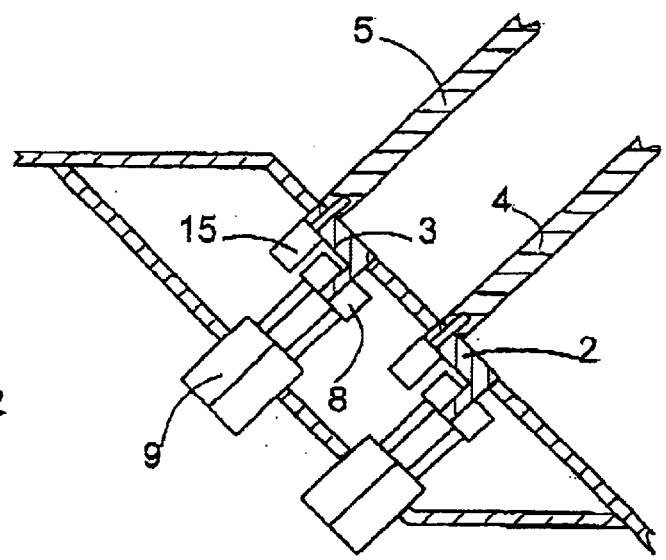
FIG. 4c
FIG. 5

AIRCRAFT ROTOR AND AIRCRAFT

This application is a continuation-in-part of international application No. PCT/FI00/00754, filed 7 Sep. 2000, the disclosure of which is incorporated herein by reference.

BACKGROUND OF THE INVENTION

The invention relates to an aircraft rotor which is arranged to rotate around a substantially vertical axis and which comprises at least two blades.

Further, the invention relates to an aircraft which comprises a body and at least one rotor attached to the body and arranged to rotate around a substantially vertical axis and comprising at least two blades.

Typically, helicopters have one rotor rotating around a substantially vertical axis, whereby the rotor blades rotate substantially horizontally. Helicopters have been presented, which comprise two rotors rotating around a substantially vertical axis, whereby the rotors can rotate in opposite directions. When the helicopter takes off, the blade angles are adjusted to be positive. After the take-off, when flying level, the blade angles of the rotor blades are adjusted as a function of the angle of rotation in such a manner that in the direction of travel, at the rear of the helicopter, the blade angle is greater than at the front of the helicopter. The helicopter then banks slightly. All in all, this type of control mechanics is quite complex.

SUMMARY OF THE INVENTION

It is an object of the present invention to provide a new type of aircraft rotor and aircraft.

The aircraft rotor of the invention is characterized in that when rotating, the blades form a conical surface, whereby to provide ascending force, the ascending force coefficients of the blades can be adjusted to be positive and to provide propulsive force, the ascending force coefficients of the blades on the forward side and on the rear side can be adjusted to have opposite signs.

Further, the aircraft of the invention is characterized in that when rotating, the blades form a conical surface, whereby to provide ascending force, the ascending force coefficients of the blades can be adjusted to be positive and to provide propulsive force, the ascending force coefficients of the blades on the forward side and on the rear side can be adjusted to have opposite signs.

An essential idea of the invention is that the aircraft rotor is arranged to rotate around a substantially vertical axis, that the rotor comprises at least two blades, and that when rotating, the blades form a conical surface, whereby to provide ascending force, the ascending force coefficients of the blades are adjusted to be positive and to provide propulsive force, the ascending force coefficients of the blades on the forward side and on the rear side are adjusted to have opposite signs. The idea of a preferred embodiment is that the body of the aircraft is formed so that the surface area of its upper part is larger than the surface area of its lower part so that when flying level, the body produces the force lifting the aircraft upwards.

The invention provides the advantage that the aircraft can be steered in a very versatile manner and relatively easily. The aircraft can change its direction of travel quickly and the direction of the body can be adjusted by adjusting the torque of the rotors. Steering the aircraft is possible without needing to bank it. By arranging the surface area of the upper part of the body to be larger than that of the lower part of the body makes it possible to utilize the ascending force of the body during level flight and to achieve a better efficiency than in helicopters, for instance.

BRIEF DESCRIPTION OF THE DRAWINGS

The invention is described in greater detail in the appended drawings, in which

FIG. 1a is a schematic side view of an aircraft,

FIG. 1b is a schematic view of the steering principle of the aircraft of FIG. 1a during take-off, FIG. 1c is a schematic view of the steering principle of the aircraft of FIG. 1a during level flight, FIG. 2a is a schematic side view of a second aircraft.

FIG. 2b is a schematic view of the steering principle of the aircraft of FIG. 2a during take-off, FIG. 2c is a schematic view of the steering principle of the aircraft of FIG. 2a during level flight, FIG. 3a is a schematic side view of a third aircraft, FIG. 3b is a schematic view of the steering principle of the aircraft of FIG. 3a during take-off, FIG. 3c is a schematic view of the steering principle of the aircraft of FIG. 3a during level flight, FIG. 4a is a schematic view of a detail of the aircraft of FIG. 1a cross-cut at the rotor rim, FIG. 4b shows a top view of the detail in FIG. 4a, FIG. 4c shows a view of the detail of FIG. 4a from the inside of the aircraft, FIG. 5 shows another alternative for controlling blade angles.

DETAILED DESCRIPTION OF THE PREFERRED EMBODIMENTS

Figure 6:
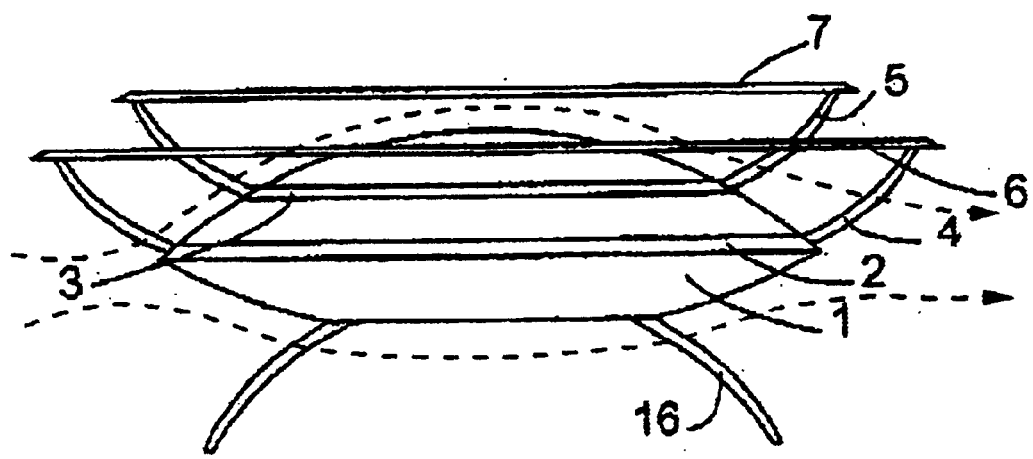
FIG. 6 is a schematic side view of a fourth aircraft.

FIG. 1a shows an aircraft which has a body 1 having two rotating rotor rims 2 and 3 arranged to its upper part. The rotor rims 2 and 3 are arranged to rotate in opposing directions. Blades 4 and 5 are arranged to the rotor rims 2 and 3. The blades 4 and 5 are arranged at approximately 45° angle to the horizontal plane, whereby the blades 4 and 5 form a conical surface when rotating. The blades 4 and 5 are at their outermost ends connected with joint rings 6 and 7. The joint rings 6 and 7 can, in cross-section, be such that their top surface is curved and the lower surface is straight, whereby they can also produce an ascending force.

When taking off with the aircraft, the ascending force coefficient of all blades of both rotors is adjusted to be positive as shown in FIG. 1b. Air then flows as shown by arrows A in FIG. 1a, and the aircraft takes off. In this application, the definition that the ascending force coefficient of the blade is positive refers to the fact that the blade produces a downward air flow. The ascending force coefficient of the blades can be adjusted to be positive by for instance adjusting the blade angles to be positive. For level flight, the ascending force coefficient of the forward side blades of the aircraft is adjusted to be negative and the ascending force coefficient of the rear side blades of the aircraft is adjusted to be positive. This produces the air flow shown by arrow B in FIG. 1a, and in the case shown by FIG. 1a, the aircraft moves from right to left. The body 1 of the aircraft is designed so that the surface area of the upper part of the body is larger than that of the lower part of the body, whereby in level flight, the body 1 produces an ascending force. Due to the design of the body 1, the air flow produced by the rotors also causes an ascending force to the body 1. Thus, in the case of FIG. 1c, the blades 4, 5 suck air from the front part of the body 1 producing a negative pressure, and blow the air to the rear of the body 1 stopping the flow from detaching and the resistance from increasing. The ascending forces of the front and rear can be adjusted during level flight by controlling the blade angles on the front and rear of the aircraft in different ways. The aircraft can change its direction of travel quickly and the direction of the body can be adjusted by adjusting the torque of the rotors. The aircraft can also move on water and land relatively smoothly without the rotors being rotated at all.

FIG. 2 shows an application in which the rotors are positioned with the conic rotor bottoms facing each other with respect to the body 1. FIGS. 2b and 2c show the ascending force coefficients of the blades during take-off and level flight in a corresponding manner to FIGS. 1b and 1c.

FIG. 3a shows an aircraft in which the rotors are positioned with the conic rotor tips facing each other with respect to the body 1, Further, FIGS. 3b and 3c show the ascending force coefficients of the blades during take-off and level flight in a corresponding manner to FIGS. 1b, 1c, 2b and 2c.

For clarity's sake, FIGS. 1b, 1c, 2b, 2c, 3b and 3c use four blades to illustrate the matter even though the aircraft of FIGS. 1a, 2a and 3a show several rotor blades.

The shape of the body of the aircraft according to FIGS. 2a and 3a is not as advantageous for utilizing the ascending force of the body as the shape of the body of the aircraft according to FIG. 1a, but instead, the relationships between the ascending forces of the front and rear of the aircraft according to FIGS. 2a and 3a are extremely easy to control.

FIG. 4a shows a solution for the structure of the rotor rims 2 and 3 and for adjusting the blade angles. Rotating rolls 8 run by electric motors 9 are arranged to rotate the rotor rims 2 and 3. The rotating rolls 8 also fit the rotor rims 2 and 3 with bearings. The blades 4 and 5 are fitted with bearings to the rotor rims 2 and 3 by crank-like swinging arms 10. Further, the rotor rims 2 and 3 have adjustment rings 11 and 12, and one end of the crank-like swinging arm 10 is arranged between the slot formed by the adjustment ring. The adjustment rings 11 and 12 are connected to each other with connecting arms 13. The adjustment rings 11 and 12 can be lifted and lowered by means of adjustment arms 14, or tilted to the desired direction. FIG. 4c illustrates how the blades 4 and 5 rotate in the opposite directions. The lower adjustment ring 12 can, for instance, be lifted by means of the adjustment arm 14, and because the adjustment rings 11 and 12 are connected to each other with connecting arms 13, the upper adjustment ring 11 lifts as well, So, if the blade angle of the lower blade 4 increases, the blade angle of the upper blade 5 also increases and correspondingly, when the blade angle of the lower blade 4 decreases, the blade angle of the upper blade 5 also decreases. FIG. 4b shows the crank-like shape of the swinging arm 10.

FIG. 5 shows a solution, in which the angle of the blades 4, 5 is adjusted with servo motors 15. This type of solution allows a more individual adjustment of each blade.

Because electric motors can be used as the power unit of the aircraft and adjustment equipment of the blade angles, the motors can also be used regeneratively and the energy use of the aircraft can be optimized by utilizing the turbulence in air flow, for instance. It is easy to adjust the torque of the rotors to be equal by making the current of the motors running the rotors equal. By adjusting the blade angles by position-controlled servo motors, the load of the blade can be read from the motor current. A processor controlling the operation of the rotors can be taught to perform energy economically optimal functions in each situation. For instance during landing, energy can be recovered. When the aircraft is on the ground or in water, the rotors are especially well-suited for wind generators to load the batteries. The rotor blades, rotor rims and body can be covered by solar cells, or most preferably, the solar cells can be a fixed part of the aircraft, i.e. the surface of the aircraft is made up of solar cells. This way, the aircraft can also be used as a dwelling. Further, fuel cells, for instance, can also be used as the energy source of the aircraft. The rotor rims and rotor can be used as a flywheel in storing the energy required for take-off. Smaller-sized motors of smaller weight can then be used.

FIG. 6 shows an aircraft, in which the lower rotor rim 2 is positioned at the widest point of the body 1. The rotor blades 4 then best prevent the pressures from equalizing between the upper and lower parts of the body 1. The blades 4 and 5 can also curve out- or inward, i.e. the conical surface formed by the blades 4 and 5 when rotating can also be curved. The aircraft of FIG. 6 has feet 16 shaped like the blade profile at the lower part of the body 1, which feet can also be used as warping wings in the air or in water. Further, the lower rotor rim 2 can also remain unrotating during take-off or landing In such a case, the lower blades 4 can be turned into a suitable angle to compensate the counter torque. Correspondingly, the upper rotor rim 3 can remain unrotating during take-off or landing. Further, the lower rotor rim 2 is not necessarily needed at all, and the blades 4 can be unrotating and supported by a circular joint ring 6. The blade angle of the lower blades should, however, be arranged adjustable so that the lower blades 4 can be turned to an optimal angle during take-off, landing and flight.

Figure 7:
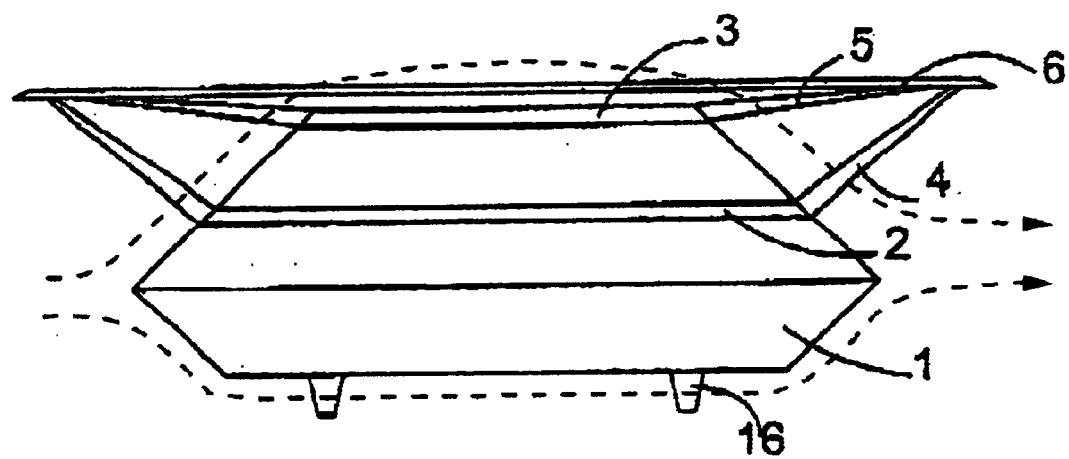
FIG. 7 is a schematic side view of a fifth aircraft.

FIG. 7 shows an application, in which the upper blades rotate in the conventional manner horizontally or the conical angle of the rotor formed by the upper rotor rim 3 and the upper blades 5 is very small, If the upper blades 5 rotate horizontally, the rotor rim 3 is not necessarily needed. The upper blades 5 can extend close to the inner surface of the joint ring 6 of the lower rotor, in which case the joint ring 6 also prevents turbulence from occurring in the blade tips of the upper rotor blades 5. The feet 16 can be telescopic, for instance, with spherical wheels at the ends.

Figure 8:
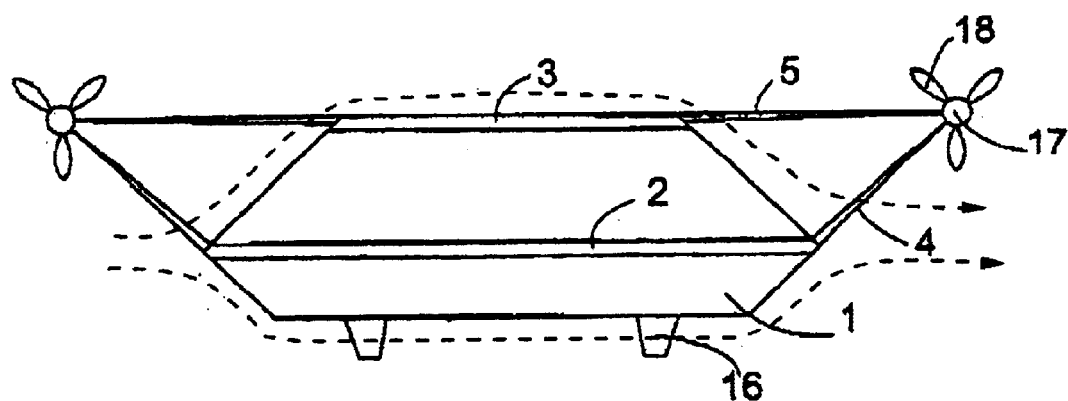
FIG. 8 is a schematic side view of a sixth aircraft.

FIG. 8 shows an aircraft, in which the lower rotor blades 4 and the upper rotor blades 5 are connected at their ends to a motor 17 which runs a propeller 18. No other rotating devices are then needed to rotate the rotor rims 2 and 3, and the propellers 18 compensate the turbulence at the tips of the blades 4 and 5. Propeller fans rotating in opposite directions can also be positioned at the tips of the blades 4 and 5.

Figure 9:
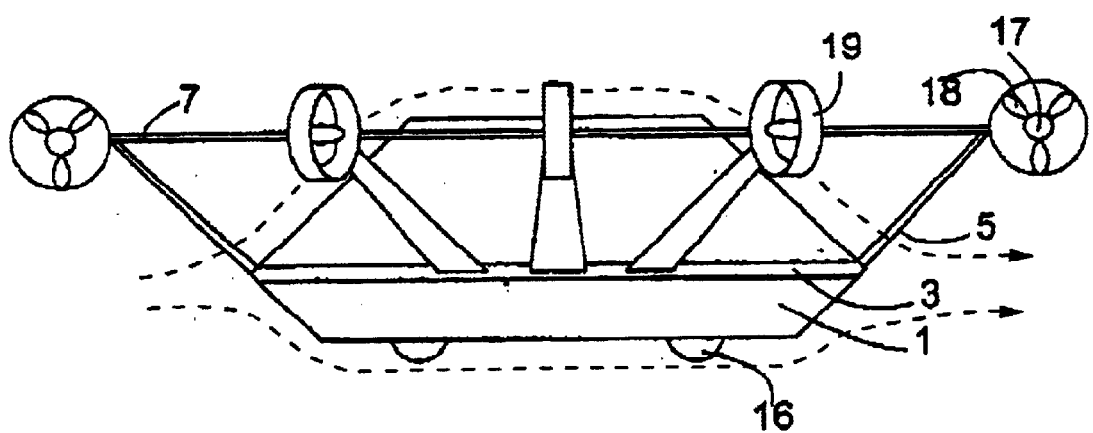
FIG. 9 is a schematic side view of a seventh aircraft.

FIG. 9 shows an application, in which the aircraft only has one rotor rim 3, i.e. only one set of rotating blades 5. Propellers 18 are arranged at the ends of the blades 5, and the blades S are connected to each other with a joint ring 7. Because in the embodiments of FIGS. 8 and 9, the torque required to rotate the rotor rims 2 and 3 is achieved by propellers 18, no torque is directed to the body 1. The motors 17 at the ends of the blades 4 and 5 act as a flywheel mass when the blades 4 and 5 rotate. The rotating rate of the propellers 18 can be adjusted as a function of the angle of rotation of the rotor, whereby the maximum point of the propulsive force of the propellers 18 can be selected suitable for steering the aircraft or for wind compensation. The propellers 18 can also act as wind generators. The propellers 18 and rims 19 arranged around them compensate tip turbulence and also provide ascending force.

Figure 10:
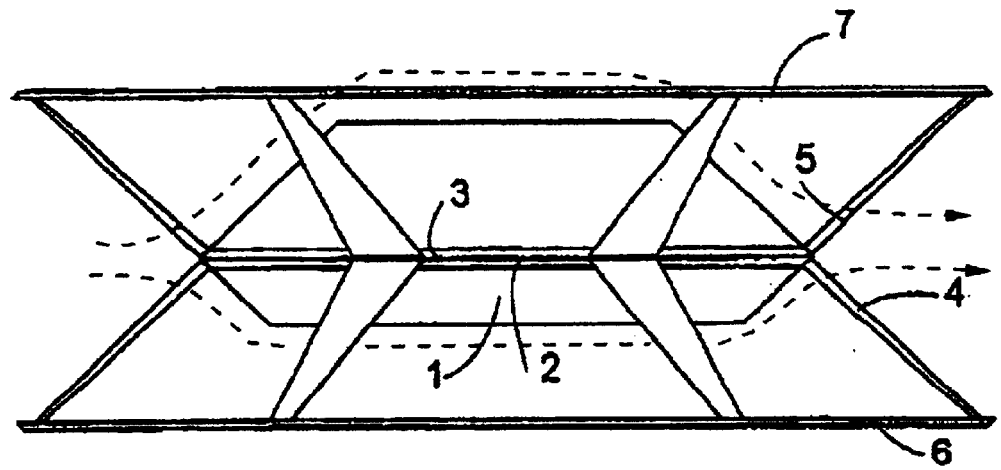
FIG. 10 is a schematic side view of a eighth aircraft.

In the embodiment of FIG. 10, the lower rotor can also act as a landing pedestal. The take-off of the aircraft can, for instance, occur in such a manner that the upper rotor is accelerated to a great speed, after which the blade angles of the blades 5 is turned to be positive, and consequently, the aircraft takes off. After the take-off, the lower rotor can be started to rotate in the opposite direction. When landing, the lower rotor is first stopped and the body 1 is allowed to rotate to create counter torque. By making the body rotate, energy can be stored at any time in the rotating body. Energy can also be stored in the second rotor by making it rotate at a greater speed than the first rotor, but at a smaller blade angle, in which case the torques of the rotors compensate each other, After this, the lower rotor, for instance, can be allowed to stop and energy is transferred to the upper rotor for landing.

Figure 11:
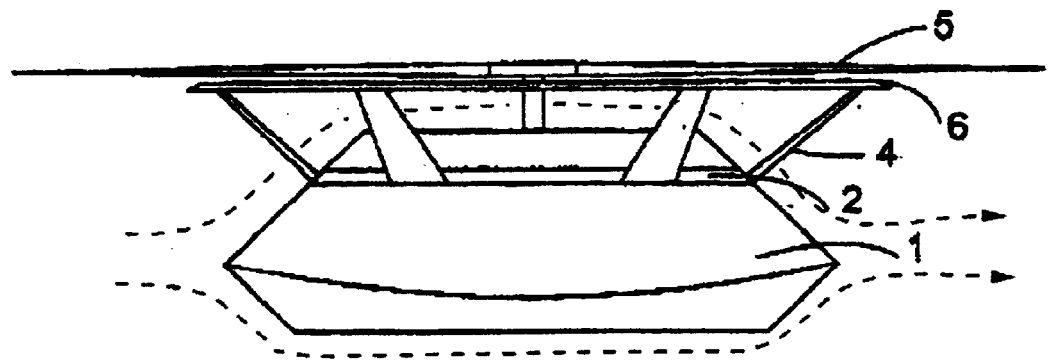
FIG. 11 is a schematic side view of a ninth aircraft.

FIG. 11 shows an aircraft, in which the upper rotor is a conventional helicopter rotor, whereas the blades 4 of the lower rotor form a conical surface when rotating. This way, it is possible to quite a large extent to apply the existing helicopter technology to the aircraft, but the properties of the aircraft can be improved as a whole by means of the new type of additional rotor.

Figure 12:
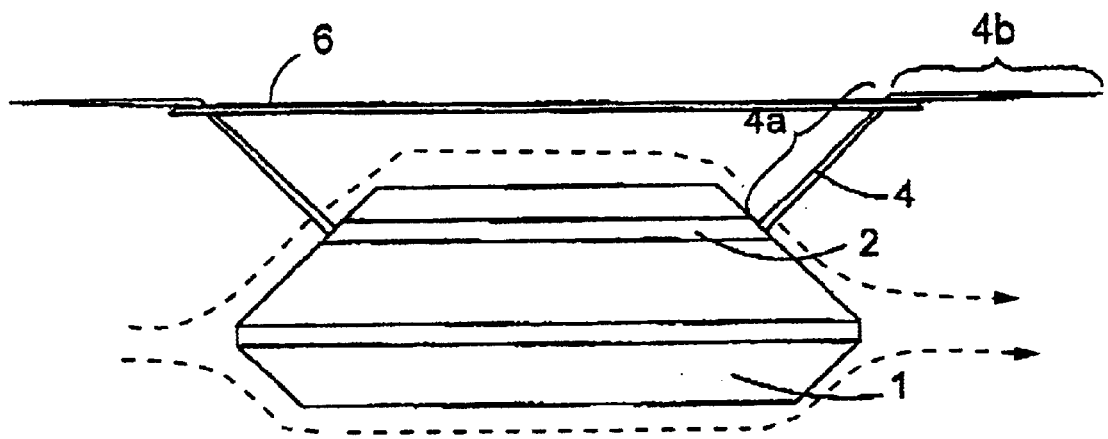
FIG. 12 is a schematic side view of a tenth aircraft.

FIG. 12 shows an aircraft, in which the forward parts 4a of the rotor blades 4 are arranged obliquely with respect to the horizontal plane and the rear parts 4b of the blades 4 are arranged to be substantially horizontal. This way, the blades 4, when rotating, form a conical surface in such a manner that the conical surface is formed of the forward parts 4a of the blades. Further, in FIG. 12, the joint ring 7 is not arranged between the tips of the blades 4 but at a distance from the tips of the blades 4 at the end of the blade parts 4a forming the conical surface. Instead of the joint ring 7, joint rods or ropes or the like can be used to connect the blades, The blades 4 can also be implemented in such a manner that only the blade angle of the forward part 4a of the blade is adjusted, in which case between the forward part 4a of the blade and the rear part 4b of the blade, there is a joint which allows the forward part 4a of the blade to turn and the rear part 4b of the blade to remain unturned. The blade 4 can also be made of an elastic material in such a manner that the turning of the blade 4 is only transmitted substantially to the forward part 4a of the blade and not at all or only partly to the rear part of the blade 4b. Because the rear part 4b of the blade is horizontal. the blades provide a great ascending force. Because the blade does, however, form a conical surface, the aircraft can be steered in a versatile manner.

Figure 13:
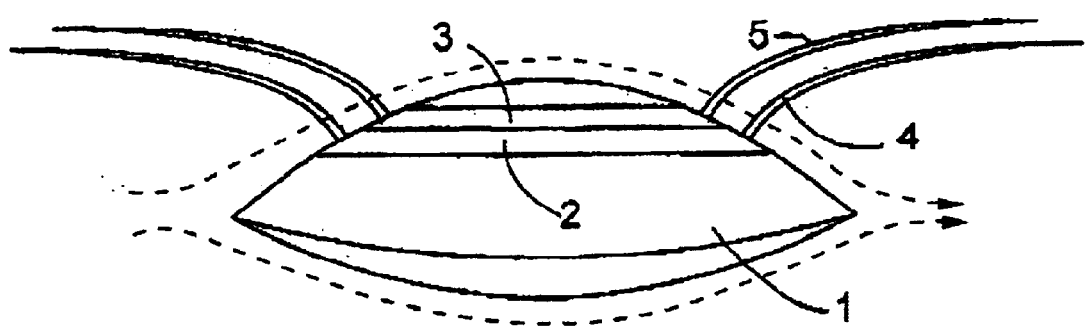
FIG. 13 is a schematic side view of a eleventh aircraft.

FIG. 13 shows an aircraft, in which the blades 4 and 5 are curved outward. The rear part of the blades 4 and 5 can be horizontal or even turned downward. The forward parts of the blades 4 and 5 do, however, form a conical surface. In the embodiment of FIG. 13, the blades 4 and 5 can also turn elastically, i.e. in such a manner that their rear parts do not turn when the blade angle is changed. The joint ring can, for instance, keep the rear part of the blade substantially from turning. The blades 4 and 5 can also be designed so that mass inertial forces keep the rear parts of the blades 4 and 5 from turning. Further, it is not necessary to arrange joint rings to support the blades 4 and 5.

Figure 14:
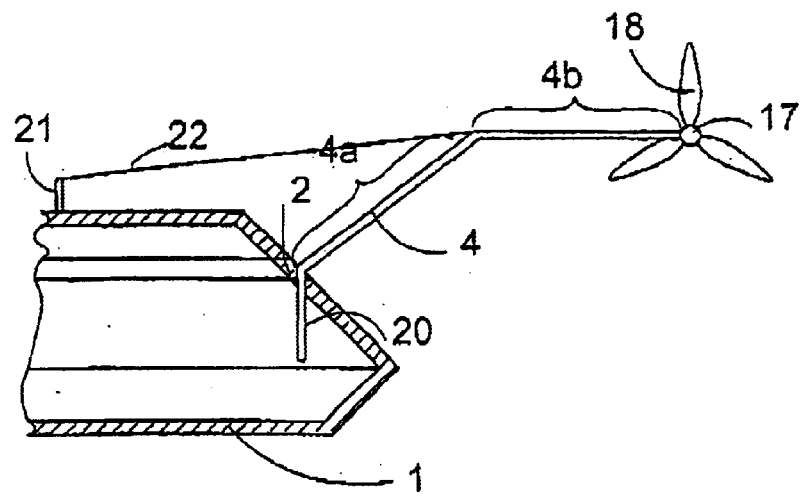
FIG. 14 is a schematic side view of a part of a twelfth aircraft in cross-section.
Figure 15:
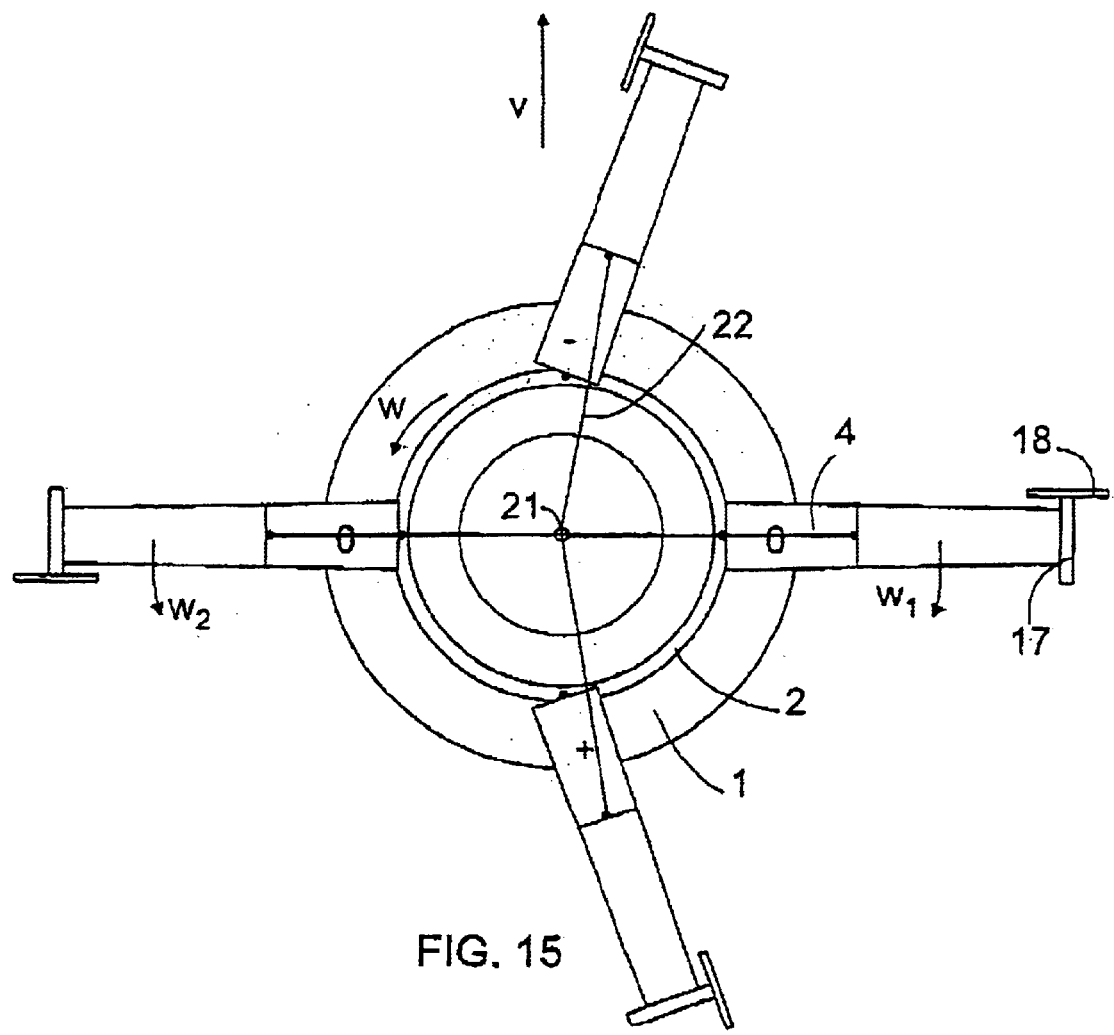
FIG. 15 is a top view the aircraft of FIG. 14, FIGS. 16a and 16b show a schematic top view of an aircraft.

In the aircraft according to FIGS. 14 and 15, the forward parts 4a of the rotor blades 4 are arranged obliquely with respect to the horizontal plane and the rear parts 4b of the blades 4 are arranged to be substantially horizontal. In the application in question, the blade angle is adjusted by turning a vertical shaft 20 at the root of the blade 4. This way, the blade angle only changes on the forward part 4a of the blade and the rear part of the blade 4b only moves horizontally without any blade angle change. When the blade 4 is turned backward around the shaft 20, the blade angle of the forward part 4a of the blade is changed to negative, i.e. the forward part 4a of the blade 4 in a way sucks air inside the conical surface formed by the forward parts 4a. Correspondingly, when the blade 4 is turned forward around the shaft 20, the blade angle of the forward part 4a of the blade changes to positive, i.e. the forward part 4a of the blade pushes air away from inside the conical surface formed by the forward parts 4a.

FIG. 15 shows how the aircraft moves upward at speed v. This horizontal speed v of the aircraft also causes a force turning the blade around the shaft 20, which facilitates the turning of the blade and consequently, adjusting its blade angle. In FIG. 15, the blade angle of the right-most blade 4 is changing from positive to negative, i.e. the blade is turning backward around the shaft 20 at speed $w_1$. The blade 4 rotates along the rotor rim 2 at peripheral speed w, i.e. at the shaft 20, the peripheral speed of the blade is w, but the peripheral speed of the rest of the blade is $w-w_1$, in other words, the peripheral speed of the blade 4 decreases when the blade is moving toward the direction of flight. When the blade 4 moves toward the direction of flight, a force caused by the horizontal movement of the aircraft and turning the blade 4 backward around the shaft 20 is directed to it. Correspondingly, in FIG. 15, the blade angle of the leftmost blade 4 is changing from negative to positive, i.e. the blade 4 is turning forward around the shaft 20 at speed $w_2$. The speed of the blade 4 outside the shaft 20 is $w+w_2$. The peripheral speed of the blade thus increases as it moves in the opposite direction to the direction of flight. At the same time, the horizontal movement of the aircraft causes a force to the blade 4, which turns the blade 4 forward around the shaft 20. Thus, the force caused by the horizontal movement of the aircraft is active in exactly the correct direction with respect to the adjustment of the angle of the blade 4, and power transmission and control can be implemented in a simple manner. The blade angles can, for instance, be adjusted by adjusting the power of the electric motors 17 running the propellers 18 at the ends of the blades 4.

The blades 4 can be supported to a rotating hub 21 on the center axis of the aircraft. The supports 22 can be spring-like and they help support the blades 4 against centrifugal force.

Figure 16A:
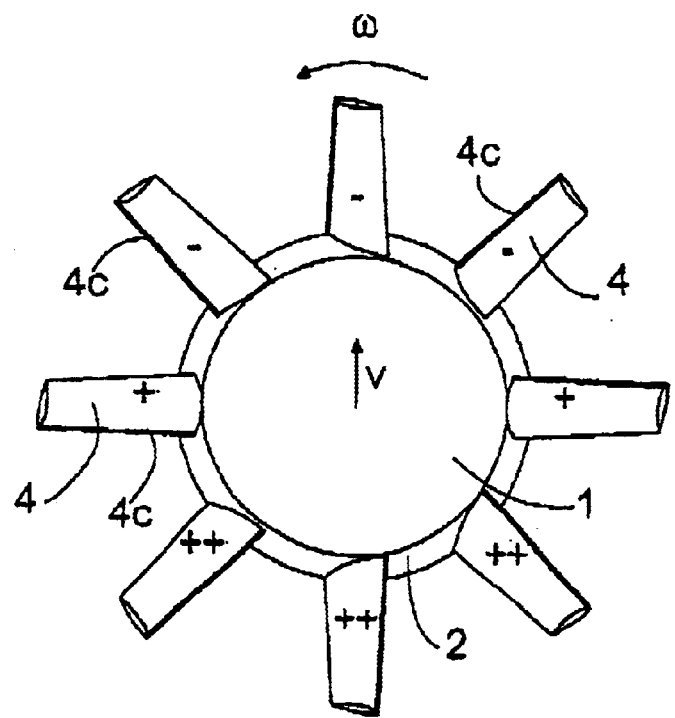
Figure 16B:
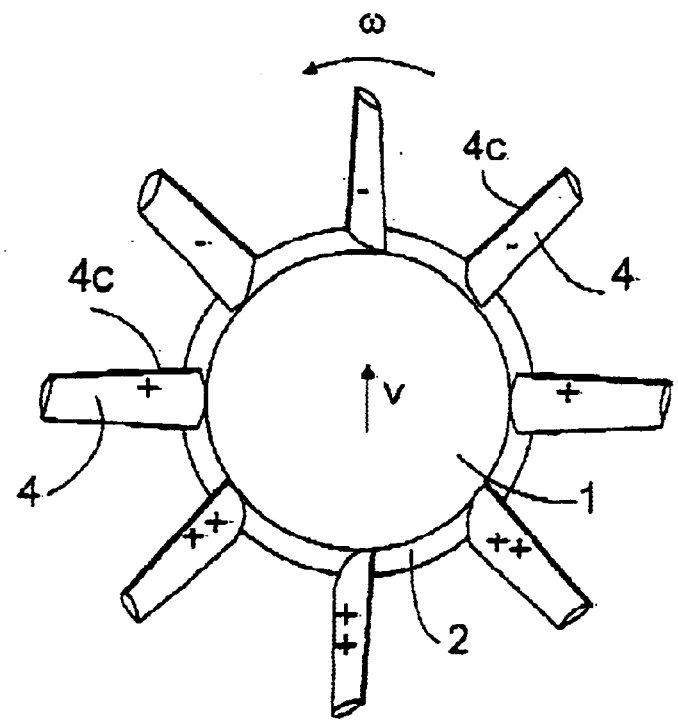

FIG. 16a illustrates the control of the angles of the aircraft blades 4 when the aircraft is moving forward at speed v. In the case of FIG. 16a, the angular speed ω of the blades is higher than the travel speed v of the aircraft, The blade angles of the blades 4 then oscillate between a positive and negative value as illustrated in the figure. The front edges 4c of the blades 4 are all the time towards the direction of rotation of the blades 4. The case of FIG. 16a thus corresponds to that in FIG. 15, When the speed of the aircraft increases, the control of the blades changes to that according to FIG. 16b. In FIGS. 16a and 16b, the front edges 4c of the blades 4 are illustrated by a thicker line. For clarity's sake, FIGS. 16a and 16b only show the part of the blades 4 that forms a conical surface. When the speed v of the aircraft is higher than the angular speed $\omega$ of the blades 4, the blades 4 are controlled in such a manner that instead of oscillating, they rotate around their swiveling axis. Thus, the front edge 4c of the blades 4 is then all the time substantially towards the direction of travel of the aircraft, Thus, when the speed v of the aircraft or the wind velocity increases sufficiently in relation to the rotation speed of the blades, the manner of controlling the blades changes from that of FIG. 16a to that of FIG. 16b.

Figure 17:
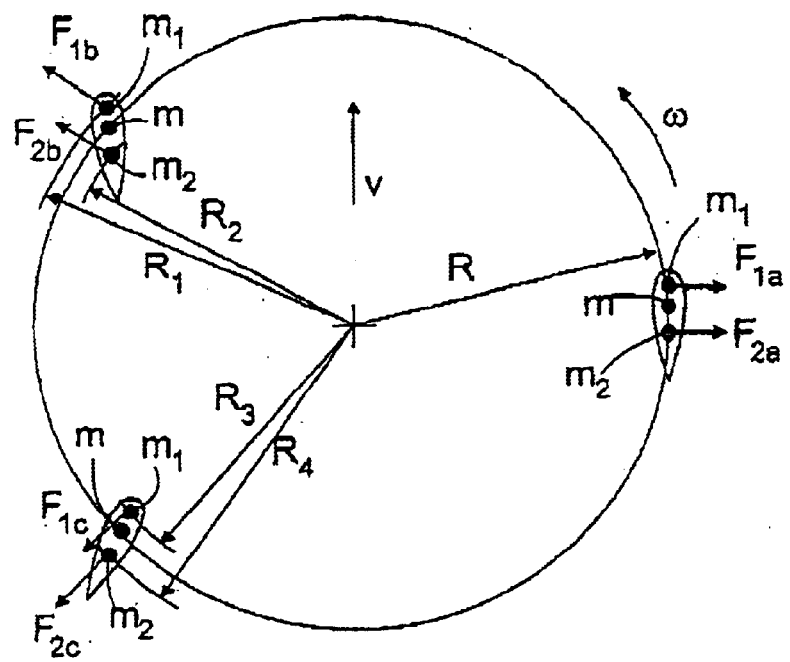
FIG. 17 shows a schematic top view of the dimensions of an embodiment of an aircraft.

The blade angles of the blades 4 need not necessarily be adjusted with a separate control device, but it can also be done by allowing the blades 4 forming a conical surface to freely rotate around their center axis marked as m in FIG. 17. When the blades are designed correctly, the centrifugal force and the flow force caused by the movement of the aircraft make the blade angles of the blades 4 adjust correctly. The center of mass m of the blade 4 should be at the axis of revolution. Then the center of mass of the front part of the blade, i.e. mass $m_1$ equals the center of mass of the rear part of the blade, i.e. mass $m_2$. It is also possible to make the center of mass $m_2$ of the rear part of the blade to be slightly bigger than the center of mass $m_1$ of the front part of the blade. This way, when the aircraft ascends, the blade seeks a state where it provides an ascending force. The axis of revolution is, however, at the front of the midpoint of the blade, which means that the blade is aerodynamically asymmetric with respect to the axis of revolution, but most preferably substantially symmetric in mass distribution. The blade 4 is affected by the centrifugal force $$F=m\omega^2 R$$

where m is the mass of the blade, $\omega$ is the angular speed of the blade, and R is the distance of the center of mass of the blade 4 from the center of rotation of the blade 4.

The front part of the rightmost blade of the three-blade air-craft shown in FIG. 17 is affected by the centrifugal force $$F_{1a}=m_1\omega^2 R$$

and the rear part of the blade is affected by the centrifugal force $$F_{2a}=m_2\omega^2 R$$

Because $m_1=m_2$, the rightmost blade is not turned around the swiveling axis. When the blade 4 rotates forward, a flow force resulting from the speed v starts to affect it and turns the blade 4 so that its ascending force coefficient changes to negative. The front part of the blade is then affected by the centrifugal force $$F_{1b}=m_1\omega^2 R_1$$

and the rear part of the blade is affected by the centrifugal force $$F_{2b}=m_2\omega^2 R_2,$$

where $R_1$ is the distance of the center of mass $m_1$ of the front part of the blade from the center of rotation of the blade, and $R_2$ is the distance of the center of mass of the rear part of the blade from the center of rotation of the blade.

Because $R_1$ is bigger than $R_2$, the force $F_{1b}$ affecting the front part of the blade is stronger than the centrifugal force $F_{2b}$ affecting the rear part of the blade. Thus, the centrifugal force affects the blade 4 in that it turns it around the center of revolution m in the same direction as the flow force. Due to the flow force, when the blade further turns towards the rear part of the aircraft, its ascending force coefficient changes to positive. This is illustrated in FIG. 17 with the lowest blade. The front part of the lowest blade is affected by the centrifugal force $$F_{1c}=m_1\omega^2 R_3$$

and the rear part of the blade is affected by the centrifugal force $$F_{2c}=m_2\omega^2 R_4.$$

$R_3$ is then smaller than $R_4$, so $F_{1c}$ is weaker than $F_{2c}$. The effect of centrifugal forces to the turning of the blade is designed in such a manner that the turning of the blade is guided by the flow force and the centrifugal force only strengthens the effect of the flow force. Taking off to level flight or increasing or decreasing speed is done by changing the center of gravity of the aircraft for instance by adjusting the location of the batteries or some other load in the aircraft, after which the adjusting system of blade angles shown in the figure begins to operate. FIG. 17 shows the turning of the blade angles when the flight speed v of the aircraft is higher than the angular speed $\omega$ of the blades, i.e. the front edges 4c of the blades 4 are with respect to the direction of travel all the time substantially as in FIG. 16b.

Figure 18:
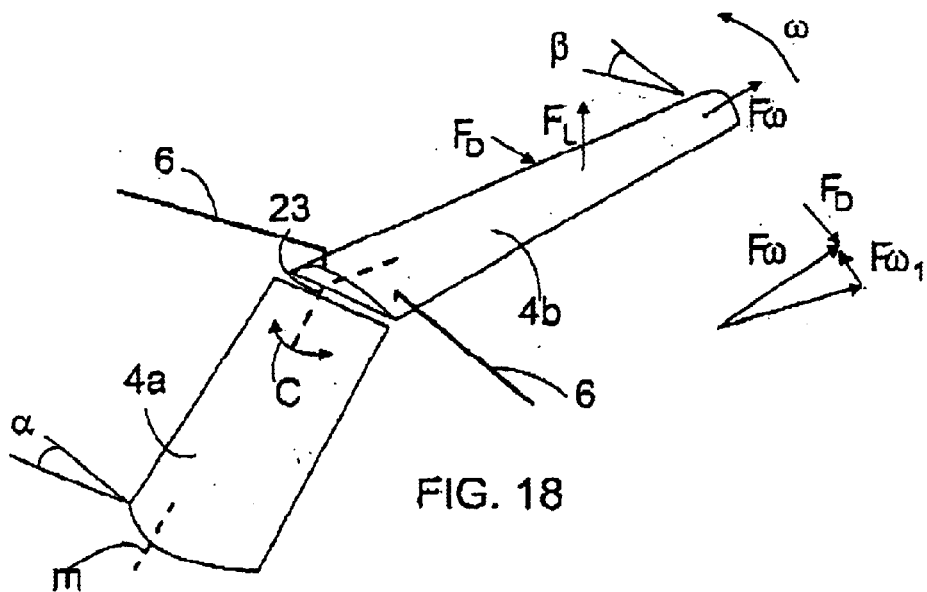
FIG. 18 shows a schematic view of the basic structure of a wing of an aircraft.

FIG. 18 shows a solution, in which the horizontal section 4b of the blade 4 is fastened rotatably around axis 23 in relation to the forward part 4a forming a conical surface of the blade 4, as illustrated by arrow C. The blade angle $\beta$ of the rear part 4b of the blade can thus be adjusted independent of the forward part 4a of the blade. Correspondingly, the blade angle $\alpha$ of the forward part 4a of the blade can be adjusted independent of the rear part 4b of the blade by turning the forward part 4a of the blade around the axis in the center of mass m. The rear part 4b turns elastically, because the connecting bars joining the blades together are elastic or fastened in an elastic manner to the blades.

In radial direction, a centrifugal force $F\omega$ is directed to the blade. Further, a flow force $F_D$ which is opposite to the direction of rotation and caused by friction, I.e. flow resistance, is directed to the blade. The flow force $F_D$ turns the tip of the blade backwards. FIG. 18 illustrates the fact that the counter force of the flow force $F_D$ is a component $F\omega_1$ of the centrifugal force $F\omega$. The forces thus settle in a balanced state in which the flow force $F_D$ equals the centrifugal force component $F\omega_1$. This balance also defines the blade angle $\beta$ of the rear part 4b of the blade, When the blade angle $\beta$ of the rear part 4b of the blade is positive and the flow speed directed to the blade increases for instance when the rotation speed increases or due to an abrupt gust of wind, the ascending force $F_L$ of the of the blade typically increases. In the case of FIG. 18, the rear part 4b of the blade can, however, turn in relation to the forward part 4a of the blade. In such a case, a change in the flow force $F_D$ or in mass inertial force can turn the rear part 4b of the blade in such a manner that the angle of ascent β of the blade decreases, whereby the ascending force $F_L$ decreases. This type of solution thus compensates automatically the changes caused by acceleration, and the blade reacts automatically to gusts of wind, i.e. the ascending force $F_L$ of the blade does not change substantially because of a gust of wind. Further, the effect to the blade angle of the rear part 4b of the blade is automatically directed in the correct direction when the blade rotates, because the effect to the blade angle β is directed in different directions depending on whether the blade is on the right or left side of the aircraft in relation to the direction of travel.

When accelerating the blade, the mass inertial force thus tries to keep the blade angle β small, and when the acceleration ends, the blade angle β increases. The ascending force is thus not very strong when the blade of the aircraft is accelerated, but during the acceleration, the aircraft can remain stationary, and when the acceleration ends, the ascending force coefficient of the rear part 4b of the blade becomes higher, and consequently, the aircraft can be guided to ascend by ending the acceleration of the rotation speed of the blades.

Figure 19:
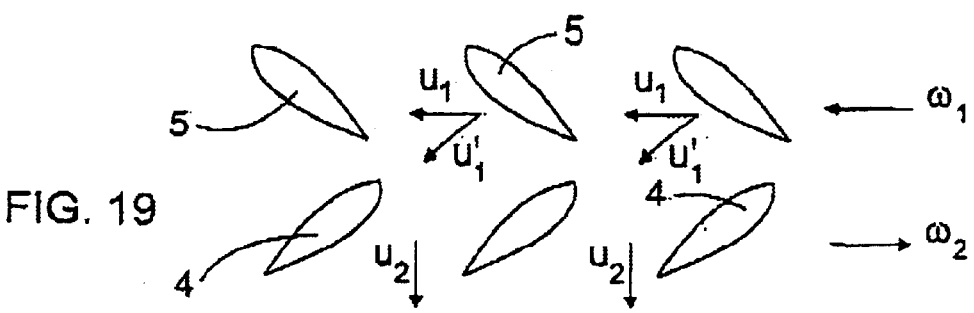
FIG. 19 shows a schematic view of the flows caused by the wings of a two-rotor aircraft.

FIG. 19 illustrates flow components generated by the blades of a two-rotor aircraft. The solution of FIG. 19 can depict an application according to FIG. 1a, for instance. The upper blades 5 rotate in the direction of rotation $\omega_1$ and the lower blades 4 rotate in the opposite direction $\omega_2$. The blades 4 and 5 forming a conical surface can function as the blades of a centrifugal blower also generating a flow component in the direction of rotation. The upper blades thus generate a flow component $u_1$ in the direction of rotation $\omega_1$, which causes an air flow, the actual direction of which is illustrated with arrows $u_1'$. Because the lower blades 4 rotate in the opposite direction $\omega_2$, a resultant flow is generated, i.e. the final flow direction of the air flow is substantially downwards as shown by arrows $u_2$. The air flow $u_2$ can thus be directed downwards to generate a higher ascending force during take-off. In such a case, the number of blades in the aircraft can be quite high. For instance, there can be 15 upper blades 5 and 16 lower blades 4. The number of the upper blades is preferably different than the number of the lower blades so that all or several upper blades are not simultaneously at the same location as a lower blade when the blades pass each other, This type of solution reduces the noise generated by the blades. When the number of aircraft blades is quite high, the blades can be rotated quite slowly, thus minimizing power loss.

All in all, the operation of the invention can also be described as follows: during take-off, the blade parts that form a conical surface and the horizontal tip parts of the blades generate a maximal ascending force. The blades forming the conical surface when being at the side of the aircraft generate a part of the ascending force and prevent the pressures from equalizing between the upper and lower part of the body, i.e. prevent turbulence from being formed over the body. When the blades forming the conical surface are in the front part of the aircraft, they generate a propulsion force and guide the flow over the body of the aircraft. When in the rear part of the aircraft, said blade parts also generate a propulsion force and guide the flow in the back part of the aircraft body. During level flight, the blade angles of the horizontal tip parts of the blades an be kept at nearly 0, since the rotor rotates slower than during take-off, when the task of the horizontal tip parts is to prevent tip turbulence of the blade parts forming the conical surface. This way, the performance of the aircraft can be maximized and the power consumption minimized. Because in the aircraft of the invention, the flight speed during level flight can be higher than the rotation speed of the rotor, power loss can also be minimized.

The drawings and the related description is intended only to illustrate the idea of the invention. The invention may vary in detail within the scope of the claims. Thus, the ascending force coefficient of the blade can, without changing the blade angle, also be adjusted in such a manner, for instance, that an adjustable aileron is arranged to the blade. Further, any other solution suitable for the purpose can be used to alter the ascending force coefficient. The body 1 of the aircraft can be round or oval as seen from above. The blades 4 and 5 can also be curved forward or backward with respect to their direction of rotation. In optimally designed blades, friction force and centrifugal force on one hand, and ascending force and centrifugal force on the other hand compensate each other when the aircraft takes off and requires the highest rotation speed. One rotor has at least two blades, but the number of the blades can vary. Most preferably, each rotor has 5 to 16 blades. The size of the aircraft can vary from small radio-controlled aircraft to large aircraft suitable for passenger or freight transportation. Aircraft operating on sun or wind energy can also very well be used as dwellings which can move in the air or on water.

What is claimed is:

1. An aircraft which comprises a body and a first rotor connected to the body and arranged to rotate around a substantially vertical axis and comprising at least two blades, wherein the blades when rotating form a conical surface, whereby to provide ascending force, ascending force coefficients of the blades can be adjusted to be positive and to provide propulsive force, the ascending force coefficients of the blades on a forward side and on a rear side can be adjusted to have opposite signs, wherein the aircraft has a rotating circular rotor rim to which roots of the blades are connected, and wherein the aircraft has at least a second rotor.

2. An aircraft as claimed in claim 1, wherein the ascending force coefficients of the blades can be adjusted as a function of the angle of rotation of each rotor.

3. An aircraft as claimed in claim 1, wherein the ascending force coefficients of the blades are arranged to be adjusted by changing the blade angle of the blades.

4. An aircraft as claimed in claim 1, wherein the aircraft has at least two rotors arranged on top of each other, whose blades form a conical surface when rotating.

5. An aircraft as claimed in claim 4, wherein the aircraft has at least two rotors arranged on top of each other and rotating in opposite directions, the blades of the rotors forming conical surfaces in such a manner that the cone tips of the conical surfaces point downward.

6. An aircraft as claimed in claim 1, wherein the ends of the blades belonging to the same rotor are connected.

7. An aircraft as claimed in claim 1, wherein the aircraft has an electric motor for rotating the rotor and electric motors for adjusting the blade angles of the blades.

8. An aircraft as claimed in claim 1, wherein at least a part of the surfaces of the aircraft is made up of solar cells.

9. An aircraft as claimed in claim 1, wherein the aircraft can be arranged to function as a wind generator.

10. An aircraft as claimed in claim 1, wherein batteries and/or fuel cells are use as the energy source and energy storage of the aircraft.

11. An aircraft as claimed in claim 1, wherein the aircraft can be arranged to be a dwelling and/or water vehicle.

12. The aircraft as claimed in claim 1, wherein the rotor rim encompasses a circumference of said body.

13. The aircraft as claimed in claim 1, wherein the second rotor comprises at least two blades, wherein the blades of the second rotor, when rotating, form a conical surface and has a rotating circular rotor rim to which roots of blades are connected.

14. An aircraft which comprises a body and at least two rotors connected to rotating circular rotor rims and arranged to rotate around a substantially vertical axis and each comprising at least two blades, wherein the blades when rotating form a conical surface, whereby to provide ascending force, ascending force coefficients of the blades are adjustable to be positive and to provide propulsive force, the ascending force coefficient of the blades on a forward side and on a rear side are adjustable to have opposite signs, and wherein in level flight, the body of the aircraft produces an ascending force.

15. The aircraft as claimed in claim 14, wherein blade angles of the blades are controlled so that airflow is made to flow along the surface of the body by increased velocity over the upper surface of the body to increase the ascending force and to produce propulsive force during level flight.

16. The aircraft as claimed in claim 15, wherein during level flight, the blade angles of the blades on a front side of the aircraft are adjusted to be negative and the blade angles of the blades on rear side of the aircraft are adjusted to be positive.

17. An aircraft comprising:

a body having an upper part and a lower part, the upper part of the body is more convex than the lower part of the body so that when the aircraft is in level flight the body produces an ascending force;

a rotor rim situated on a level of a surface of the body; and a plurality of blades connected by respective roots to the rotor rim, wherein the blades when rotating form a conical surface such that blade angle of the blades are controlled so that airflow is made to flow along the surface of the body by increased velocity over the upper surface of the body to increase the ascending force and to produce propulsive force during level flight.

18. The aircraft as claimed in claim 17, wherein during level flight, the blade angles of the blades on a front side of the aircraft are adjusted to be negative and the blade angles of the blades on a rear side of the aircraft are adjusted to be positive.

19. The aircraft as claimed in claim 17, wherein the rotor rim encompasses an outer periphery of said upper part.

* * * * *